United States Patent
Himmelmann

(10) Patent No.: US 11,530,733 B2
(45) Date of Patent: Dec. 20, 2022

(54) INTEGRATED HYDRAULIC DAMPER FOR TORSIONAL OSCILLATION REDUCTION

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 149 days.

(21) Appl. No.: 17/088,097

(22) Filed: Nov. 3, 2020

(65) Prior Publication Data
US 2022/0136582 A1 May 5, 2022

(51) Int. Cl.
*F16F 15/16* (2006.01)
*F16D 3/80* (2006.01)

(52) U.S. Cl.
CPC .............. *F16F 15/161* (2013.01); *F16D 3/80* (2013.01); *F16F 2232/02* (2013.01)

(58) Field of Classification Search
CPC ........ F16F 15/16; F16F 15/161; F16F 15/162; F16F 2230/06; F16F 2232/02; F16D 3/80
See application file for complete search history.

(56) References Cited

U.S. PATENT DOCUMENTS

| | | | | |
|---|---|---|---|---|
| 2,184,504 A | * | 12/1939 | Pielstick | F16F 15/161 74/573.12 |
| 2,738,660 A | | 3/1956 | Gail | |
| 2,812,648 A | * | 11/1957 | Croset | F16D 3/80 464/24 |
| 3,365,913 A | * | 1/1968 | Shields | F16D 3/80 184/6.12 |
| 4,173,158 A | * | 11/1979 | Geislinger | F16D 3/80 248/562 |
| 5,083,980 A | * | 1/1992 | Focoueur | F16F 15/161 192/208 |
| 6,747,383 B2 | | 6/2004 | Tornquist et al. | |
| 7,992,661 B2 | * | 8/2011 | Nomura | F16F 15/123 180/65.245 |
| 9,664,251 B2 | | 5/2017 | Harby et al. | |
| 9,985,501 B2 | * | 5/2018 | Ribarov | H02K 1/32 |
| 10,274,040 B2 | | 4/2019 | Mao et al. | |
| 2022/0224196 A1 | * | 7/2022 | Himmelmann | H02K 7/14 |

FOREIGN PATENT DOCUMENTS

EP 2169261 A2 * 3/2010 ............... F16H 1/10

* cited by examiner

*Primary Examiner* — Adam D Rogers
(74) *Attorney, Agent, or Firm* — Cantor Colburn LLP

(57) ABSTRACT

A rotor assembly of an electric machine includes a rotor body and a shaft assembly located at a central axis of the rotor assembly, and operably connected to the rotor body. The shaft assembly includes a main rotor shaft operably connected to the rotor body, a center drive shaft located inside of the main rotor shaft, and a hydraulic damper sleeve located radially between the main rotor shaft, defining a plurality of cavities between the hydraulic damper sleeve and the center drive shaft. The hydraulic damper sleeve is configured to urge a fluid into and out of the plurality of cavities thereby damping relative circumferential motion between the main rotor shaft and the center drive shaft.

19 Claims, 4 Drawing Sheets

INTEGRATED HYDRAULIC DAMPER FOR TORSIONAL OSCILLATION REDUCTION

BACKGROUND

Exemplary embodiments pertain to the art of electrical power generators for, for example, aircraft.

Aircraft require electrical power for systems such as avionics, flight controls, passenger comfort and various other systems. The necessary electrical power is typically generated by engine-driven generators and by auxiliary power unit (APU) driven generators.

In some operating conditions, a generator may experience a sustained torsional vibration. This torsional vibration, when combined with a spring rate of a center drive shaft of the generator, causes a relative velocity to be generated between a main rotor shaft of the generator and the center drive shaft nested inside of the main rotor shaft.

BRIEF DESCRIPTION

In one embodiment, a rotor assembly of an electric machine includes a rotor body and a shaft assembly located at a central axis of the rotor assembly, and operably connected to the rotor body. The shaft assembly includes a main rotor shaft operably connected to the rotor body, a center drive shaft located inside of the main rotor shaft, and a hydraulic damper sleeve located radially between the main rotor shaft, defining a plurality of cavities between the hydraulic damper sleeve and the center drive shaft. The hydraulic damper sleeve is configured to urge a fluid into and out of the plurality of cavities thereby damping relative circumferential motion between the main rotor shaft and the center drive shaft.

Additionally or alternatively, in this or other embodiments the hydraulic damper sleeve includes one or more sleeve vanes extending radially inwardly to the center drive shaft, the center drive shaft includes one or more shaft vanes extending radially outwardly to the hydraulic damper sleeve, and the one or more sleeve vanes and the one or more shaft vanes at least partially define the plurality of cavities.

Additionally or alternatively, in this or other embodiments the one or more shaft vanes are circumferentially offset from the one or more sleeve vanes.

Additionally or alternatively, in this or other embodiments a plurality of vent passages extend from the plurality of cavities through the center drive shaft and into a hollow interior of the center drive shaft.

Additionally or alternatively, in this or other embodiments the fluid is urged into and out of the plurality of cavities via the plurality of vent passages.

Additionally or alternatively, in this or other embodiments the plurality of vent passages are circumferentially located between adjacent shaft vanes and/or sleeve vanes.

Additionally or alternatively, in this or other embodiments the hydraulic damper sleeve is secured to the main rotor shaft via a press fit.

Additionally or alternatively, in this or other embodiments the fluid is oil.

Additionally or alternatively, in this or other embodiments the center drive shaft is configured for connection to an input shaft for supplying rotational energy to the rotor assembly.

In another embodiment, an electric machine includes a housing, a stator located in the housing, a rotor assembly located in the housing and defining an air gap to the stator. The rotor assembly includes a rotor body, and a shaft assembly located at a central axis of the rotor assembly, and operably connected to the rotor body. The shaft assembly includes a main rotor shaft operably connected to the rotor body, a center drive shaft located inside of the main rotor shaft, and a hydraulic damper sleeve located radially between the main rotor shaft and the center drive shaft, defining a plurality of cavities between the hydraulic damper sleeve and the center drive shaft. The hydraulic damper sleeve is configured to urge a fluid into and out of the plurality of cavities thereby damping relative circumferential motion between the main rotor shaft and the center drive shaft.

Additionally or alternatively, in this or other embodiments the hydraulic damper sleeve includes one or more sleeve vanes extending radially inwardly to the center drive shaft, the center drive shaft includes one or more shaft vanes extending radially outwardly to the hydraulic damper sleeve, and the one or more sleeve vanes and the one or more shaft vanes at least partially define the plurality of cavities.

Additionally or alternatively, in this or other embodiments the one or more shaft vanes are circumferentially offset from the one or more sleeve vanes.

Additionally or alternatively, in this or other embodiments a plurality of vent passages extend from the plurality of cavities through the center drive shaft and into a hollow interior of the center drive shaft.

Additionally or alternatively, in this or other embodiments the fluid is urged into and out of the plurality of cavities via the plurality of vent passages.

Additionally or alternatively, in this or other embodiments the plurality of vent passages are circumferentially located between adjacent shaft vanes and/or sleeve vanes.

Additionally or alternatively, in this or other embodiments the hydraulic damper sleeve is secured to the main rotor shaft via a press fit.

Additionally or alternatively, in this or other embodiments the fluid is oil.

Additionally or alternatively, in this or other embodiments the center drive shaft is configured for connection to an input shaft for supplying rotational energy to the rotor assembly.

Additionally or alternatively, in this or other embodiments the electric machine is an electrical generator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
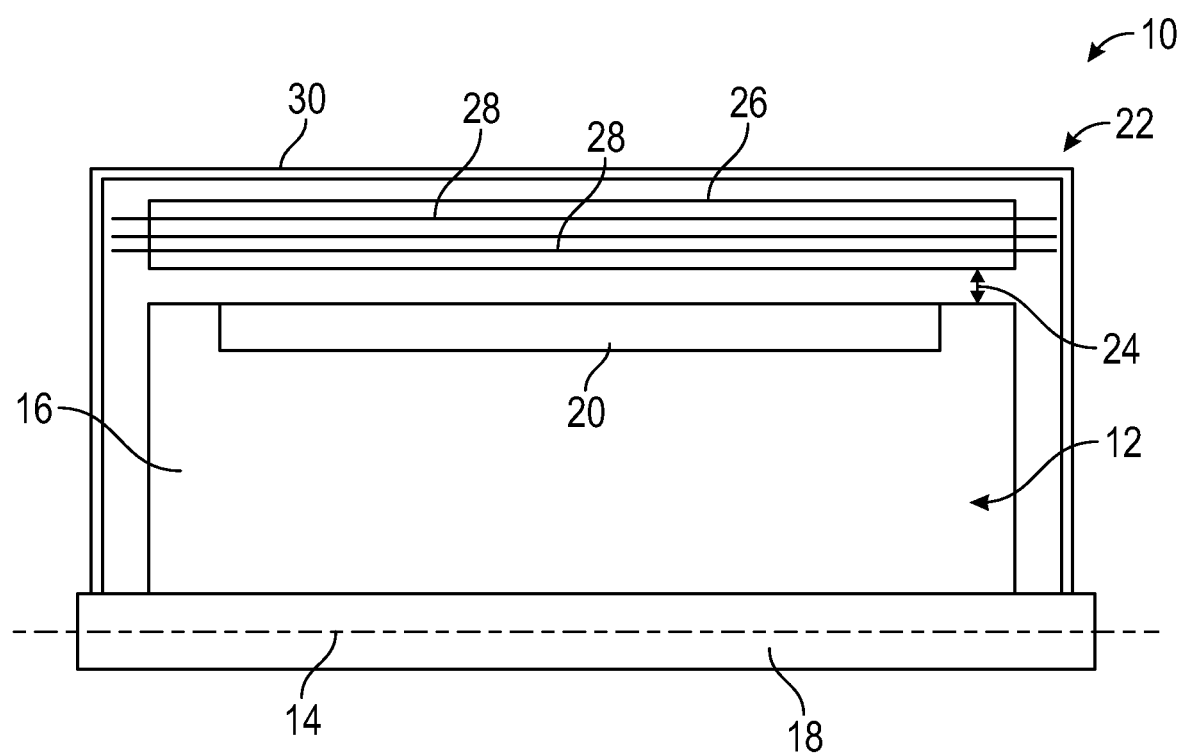
FIG. 1 is a schematic illustration of an embodiment of an electric machine.

Referring now to FIG. 1, illustrated is a schematic view of an embodiment of an electric machine 10. The electric machine 10 includes a rotor assembly 12 configured to rotate about a machine central axis 14. In some embodiments, the rotor assembly 12 includes a rotor body 16, and a rotor shaft assembly 18 located at the machine central axis 14. In some embodiments, the electric machine 10 is a wound field electric machine with a plurality of permanent magnets 20 located at the rotor body 16. A stator 22 is located radially outboard of the rotor assembly 12 defining a radial air gap 24 between the stator 22 and the rotor assembly 12. The stator 22 includes a stator core 26 and a plurality of stator windings 28 extending through the stator core 26 which are magnetically interactive with the rotor assembly 12. The rotor assembly 12 and stator 22 are located inside of a housing 30 which seals the electric machine 10 from the outside environment. The rotor shaft assembly 18 incorporates a damper sleeve 46, further discussed with reference to FIGS. 3 and 4, that addresses the torsional vibration experienced by prior generators.

In some embodiments, the electric machine 10 is configured as a generator, in which rotational energy is input into the rotor assembly 12, which energizes the stator windings 28 via electromagnetic interaction between the rotor assembly 12 and the stator windings 28 across the air gap 24.

Figure 2:
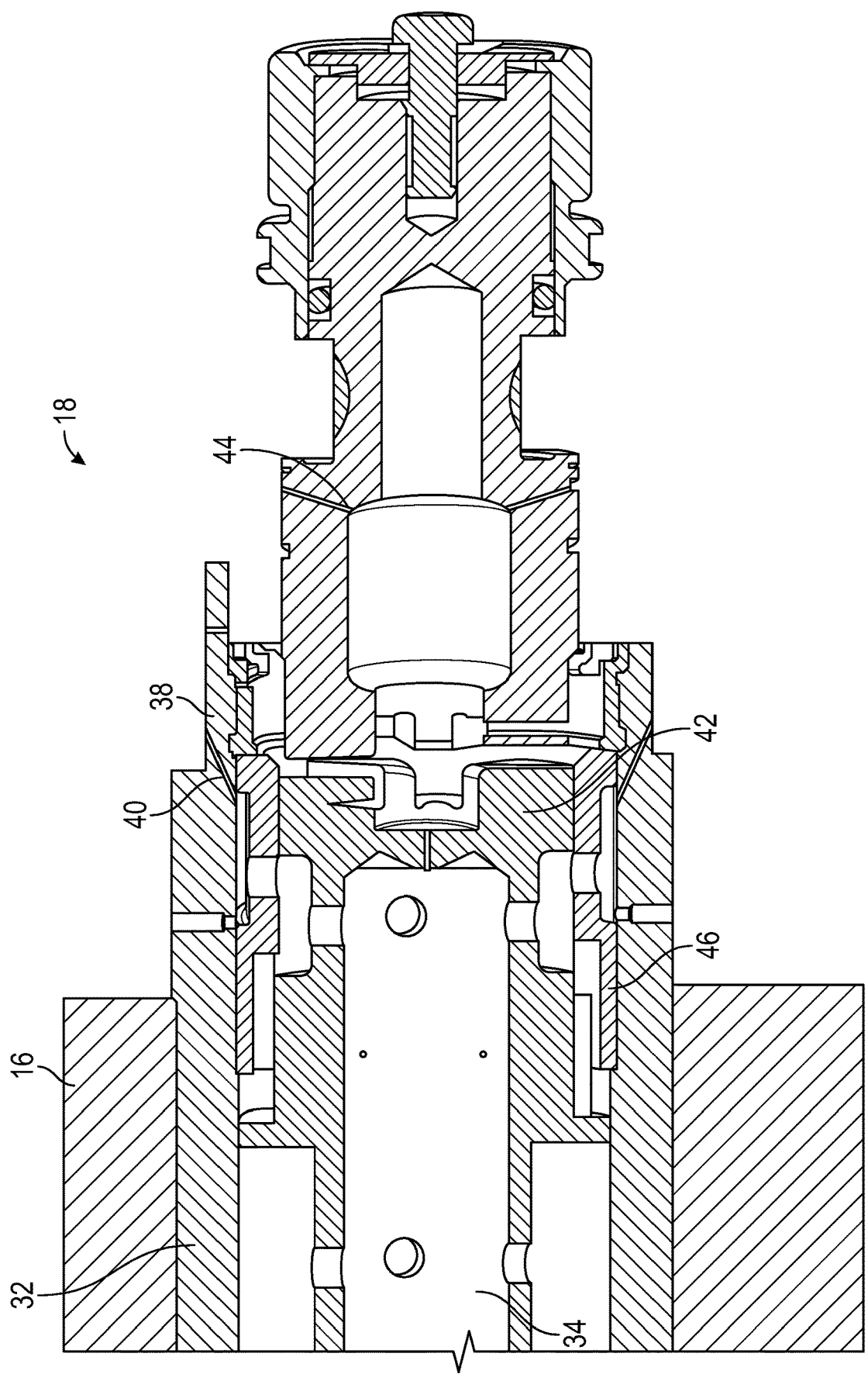
FIG. 2 is a partial cross-sectional view of an embodiment of an electric machine.

Referring to FIG. 2, the rotor shaft assembly 18 includes a main rotor shaft 32 from which the rotor body 16 extends, and a center drive shaft 34 located inside the main rotor shaft 32 and extending along a length of the main rotor shaft 32. The center draft shaft 34 is secured to the main rotor shaft 32 at a second end (not shown) of the center drive shaft 34 opposite a first shaft end 40.

Further, the center drive shaft 34 includes one or more connection features 42 at the first shaft end 40, such that the center drive shaft 34 is selectably connectible to and disconnectable from an input shaft 44, which transfers rotational energy from, for example, a gas turbine engine (not shown) to drive rotation of the rotor assembly 12.

Figure 3:
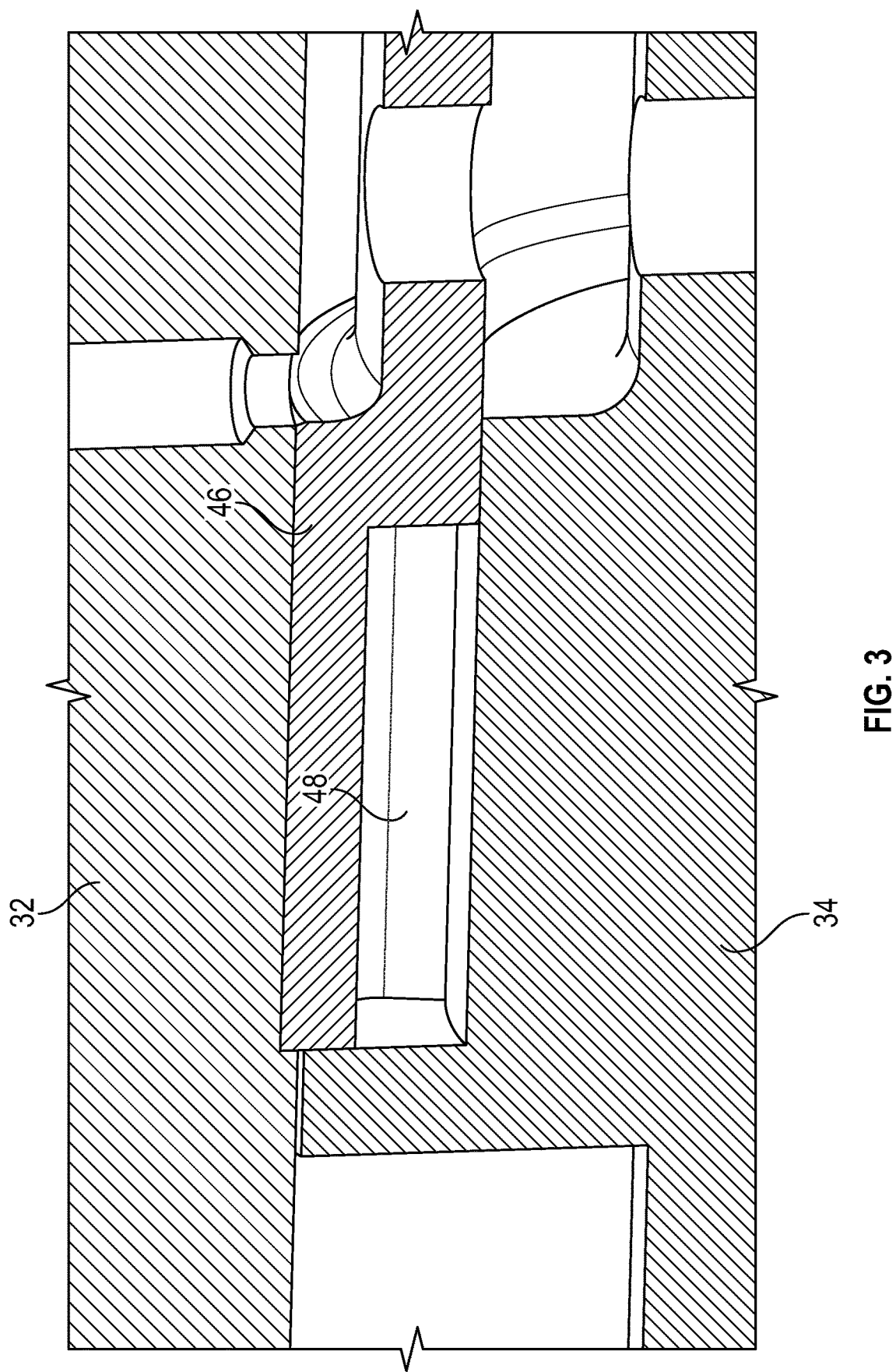
FIG. 3 is a cross-sectional view of an embodiment of a shaft assembly with a hydraulic damper sleeve.
Figure 4:
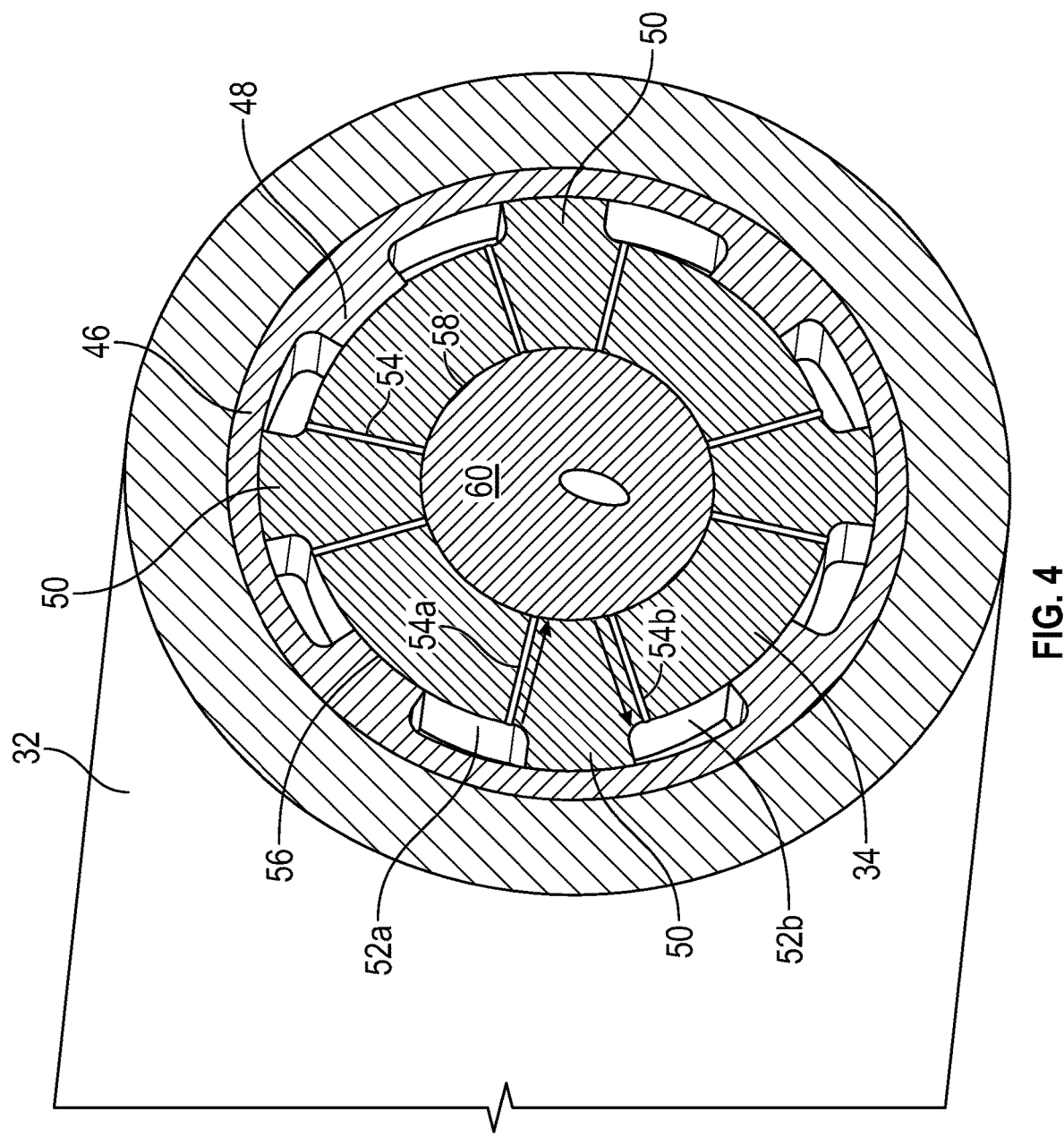
FIG. 4 is a perspective view of an embodiment of a shaft assembly with a hydraulic damper sleeve.

Referring now to FIGS. 3 and 4, the rotor shaft assembly 18 further includes a hydraulic damper sleeve 46 press fit into the main rotor shaft 32 between the main rotor shaft 32 and the center drive shaft 34, with a tight clearance fit to the center drive shaft 34. The damper sleeve 46 may be further retained in place by a retention nut 38 installed to the main rotor shaft 32. The hydraulic damper sleeve 46 includes a number of sleeve vanes 48 which extend radially inwardly to the center drive shaft 34, and the center drive shaft 34 similarly includes a number of shaft vanes 50 extending radially outwardly to the damper sleeve 46. The shaft vanes 50 are circumferentially offset from the sleeve vanes 48 and define a plurality of cavities 52 between circumferentially adjacent sleeve vanes 48 and shaft vanes 50. The center drive shaft 34 includes a plurality of vent passages 54 extending from a shaft outer surface 56 and through a shaft inner surface 58 to a hollow center drive shaft interior 60. The plurality of cavities 52 and the shaft interior 60 have a volume of fluid, for example, oil, located therein.

As shown in FIG. 4, in some operating conditions, the main rotor shaft 32 and the center drive shaft 34 have a relative velocity. As the center drive shaft 34 rotates relative to the main rotor shaft 32, fluid is forced out of a first cavity 52a via a first vent passage 54a and into the shaft interior 60. While this is occurring, fluid is also backfilling second cavity 52b, by flowing from the shaft interior 60 and through a second vent passage 54b. As the fluid is forced through the vent passages 54, energy is absorbed through viscous drag. This energy absorption provides a damping force, this damping the relative motion of the center drive shaft 34 and the main rotor shaft 32.

The hydraulic damper sleeve 46 disclosed herein is retrofittable into existing electric machines 10, with only slight modifications to the main rotor shaft 32 and center drive shaft 34, and still allows for convertibility of the center drive shaft 34 to the input shaft 44, and does not require other modification of the rotor assembly 12 to incorporate the hydraulic damper sleeve 46.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotor assembly of an electric machine, comprising:
   a rotor body;
   a shaft assembly disposed at a central axis of the rotor assembly, and operably connected to the rotor body, the shaft assembly including:
   a main rotor shaft operably connected to the rotor body;
   a center drive shaft disposed inside of the main rotor shaft; and
   a hydraulic damper sleeve disposed radially between the main rotor shaft and the center drive shaft, defining a plurality of cavities between the hydraulic damper sleeve and the center drive shaft, the hydraulic damper sleeve configured to urge a fluid into and out of the plurality of cavities thereby damping relative circumferential motion between the main rotor shaft and the center drive shaft.

2. The rotor assembly of claim 1, wherein:
   the hydraulic damper sleeve includes one or more sleeve vanes extending radially inwardly to the center drive shaft;
   the center drive shaft includes one or more shaft vanes extending radially outwardly to the hydraulic damper sleeve; and
   the one or more sleeve vanes and the one or more shaft vanes at least partially define the plurality of cavities.

3. The rotor assembly of claim 2, wherein the one or more shaft vanes are circumferentially offset from the one or more sleeve vanes.

4. The rotor assembly of claim 2, further comprising a plurality of vent passages extending from the plurality of cavities through the center drive shaft and into a hollow interior of the center drive shaft.

5. The rotor assembly of claim 4, wherein the fluid is urged into and out of the plurality of cavities via the plurality of vent passages.

6. The rotor assembly of claim 4, wherein the plurality of vent passages are circumferentially located between adjacent shaft vanes and/or sleeve vanes.

7. The rotor assembly of claim 1, wherein the hydraulic damper sleeve is secured to the main rotor shaft via a press fit.

8. The rotor assembly of claim 1, wherein the fluid is oil.

9. The rotor assembly of claim 1, wherein the center drive shaft is configured for connection to an input shaft for supplying rotational energy to the rotor assembly.

10. An electric machine, comprising:
a housing;
a stator disposed in the housing; and
a rotor assembly disposed in the housing and defining an air gap to the stator, the rotor assembly including:
 a rotor body;
 a shaft assembly disposed at a central axis of the rotor assembly, and operably connected to the rotor body, the shaft assembly including:
  a main rotor shaft operably connected to the rotor body;
  a center drive shaft disposed inside of the main rotor shaft; and
  a hydraulic damper sleeve disposed radially between the main rotor shaft and the center drive shaft, defining a plurality of cavities between the hydraulic damper sleeve and the center drive shaft, the hydraulic damper sleeve configured to urge a fluid into and out of the plurality of cavities thereby damping relative circumferential motion between the main rotor shaft and the center drive shaft.

11. The electric machine of claim 10, wherein:
the hydraulic damper sleeve includes one or more sleeve vanes extending radially inwardly to the center drive shaft;
the center drive shaft includes one or more shaft vanes extending radially outwardly to the hydraulic damper sleeve; and
the one or more sleeve vanes and the one or more shaft vanes at least partially define the plurality of cavities.

12. The electric machine of claim 11, wherein the one or more shaft vanes are circumferentially offset from the one or more sleeve vanes.

13. The electric machine of claim 11, further comprising a plurality of vent passages extending from the plurality of cavities through the center drive shaft and into a hollow interior of the center drive shaft.

14. The electric machine of claim 13, wherein the fluid is urged into and out of the plurality of cavities via the plurality of vent passages.

15. The electric machine of claim 13, wherein the plurality of vent passages are circumferentially located between adjacent shaft vanes and/or sleeve vanes.

16. The electric machine of claim 10, wherein the hydraulic damper sleeve is secured to the main rotor shaft via a press fit.

17. The electric machine of claim 10, wherein the fluid is oil.

18. The electric machine of claim 10, wherein the center drive shaft is configured for connection to an input shaft for supplying rotational energy to the rotor assembly.

19. The electric machine of claim 10, wherein the electric machine is an electrical generator.

* * * * *